2,857,428

2-METHYL-2-(PARA-CARBOXYPHENYL)-PENTANONE-4 AND PROCESS OF MAKING IT

Alan E. Ardis, Hamden, and Herman A. Bruson, North Haven, Conn., assignors to Olin Mathieson Chemical Corporation, New Haven, Conn., a corporation of Virginia No Drawing. Application October 19, 1954
Serial No. 463,320

5 Claims. (Cl. 260—515)

This invention relates to ketonic acids and has for its object the provision of a new compound of this character and a process for producing the compound. The new compound of the invention is 2-methyl-2-(para-carboxyphenyl) pentanone-4 which may be represented by the formula:

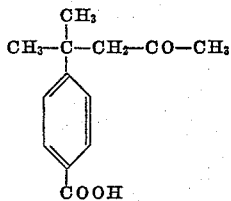

The compound is useful as an intermediate for chemical syntheses; thus, by reaction with hydroxylamine, it forms an oxime which can be reduced to the corresponding amino acid.

The process of the invention comprises the liquid phase catalytic oxidation of 2-methyl-2-(para-tolyl) pentanone-4 resulting in the oxidation of but one methyl group and forming the compound of the invention. In an advantageous embodiment of the invention the 2-methyl-2-(para-tolyl) pentanone-4 in a suitable solution and with a suitable catalyst is agitated while undergoing oxidation with molecular oxygen.

The 2-methyl-2-(para-tolyl) pentanone-4 may be obtained by condensing mesityl oxide with toluene in the presence of aluminum chloride as described by Colonge and Pichat (Bull. soc. chim., France, 1949, pp. 177–185).

In a preferred process according to the invention, the 2-methyl-2-(para-tolyl) pentanone-4 is dissolved in glacial acetic acid containing a cobalt salt, preferably cobaltous acetate, as a catalyst and a stream of air or gaseous oxygen is passed into reacting contact with the solution while at refluxing temperature and with accompanying agitation. After several hours of reaction under these conditions the resulting compound is advantageously recovered by adding the reaction product to water and recovering the compound by crystallization.

The following example illustrates a process of this invention:

A very finely dispersed stream of oxygen issuing through a porous disc is bubbled into a solution of 215 g. glacial acetic acid, 5 g. of cobaltous acetate (crystalline tetrahydrate) and 47 g. of 2-methyl-2-(para-tolyl) pentanone-4, while the mixture is rapidly stirred and heated at 105° C. under a reflux condenser. After from 24 to 48 hours of continuous passage of the oxygen, the mixture is poured into 2 liters of water and allowed to stand. A crystalline product is filtered off and washed with a little petroleum ether to remove oily material. Upon crystallization from acetic acid, the desired compound is obtained as colorless crystals, M. P. 123–124° C. By analysis the compound was found to contain carbon 70.2% and hydrogen 7.14%, whereas the theoretical amounts of carbon and hydrogen for this compound are 70.4% and 7.32% respectively.

The product gave a positive iodoform test indicating the presence of the —CO—CH$_3$ group in the product. The test was carried out as described on pages 53–4 of "Systematic Identification of Organic Compounds," by Shriner and Fuson (J. Wiley and Sons, New York, 1940, second edition).

Titration of a sample of the product with standardized alkali indicated a neutral equivalent of 222 (theoretical for the compound is 220).

We claim:

1. The compound 2-methyl-2-(para-carboxyphenyl) pentanone-4

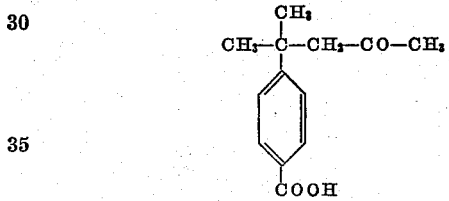

2. A process for preparing 2-methyl-2-(para-carboxyphenyl) pentanone-4 which comprises oxidizing 2-methyl-2-(para-tolyl) pentanone-4 in liquid phase in the presence of a cobaltous salt with a gas containing molecular oxygen.

3. The process of preparing 2-methyl-2-(para-carboxyphenyl) pentanone-4 which comprises dissolving 2-methyl-2-(para-tolyl) pentanone-4 in glacial acetic acid, and reacting said 2-methyl-2-(para-tolyl) pentanone-4 with molecular oxygen at an elevated temperature in the presence of a cobaltous salt as a catalyst.

4. In the process of claim 3 passing gaseous oxygen into the solution while at refluxing temperature and with accompanying agitation.

5. In the process of claim 3 using cobaltous acetate in solution in the glacial acetic acid as the catalyst.

References Cited in the file of this patent
UNITED STATES PATENTS 2,005,183    Flemming _____ June 18, 1935